United States Patent Office 3,146,234
Patented Aug. 25, 1964

3,146,234
1-SUBSTITUTED-2-PIPERAZINONES AND 1-SUB-
STITUTED-7-HOMOPIPERAZINONES
Sydney Archer, Bethlehem, N.Y., assignor to Sterling
Drug Inc., New York, N.Y., a corporation of Delaware
No Drawing. Original application Sept. 25, 1959, Ser.
No. 842,203. Divided and this application Oct. 18,
1960, Ser. No. 66,395
7 Claims. (Cl. 260—268)

This invention relates to 1-substituted-2-piperazinones and 1-substituted-7-homopiperazinones having anticonvulsant activity and which are also useful as intermediates in the preparation of 1-[(1-, 2- or 3-indolyl)-lower-alkyl]-piperazines, 1-[(1-, 2- or 3-indolyl)-lower-alkyl]homopiperazines, 1 - [ω-(3-indolyl)-ω-hydroxy-lower-alkyl]-piperazines, 1 - [ω(3-indolyl)-ω-hydroxy-lower-alkyl]homopiperazines.

3-indolyl-lower-alkylamines are known. The invention here resides in the concept of attaching a 1-piperazinyl-lower-alkyl group or a 1-homopiperazinyl-lower-alkyl group to the 1-, 2-, or 3-position of the indole nucleus or a 1-piperazinyl-ω-hydroxy-lower-alkyl group or a 1-homopiperazinyl-ω-hydroxy-lower-alkyl group to the 3-position of the indole nucleus. It is also concerned with certain novel intermediates and with processes for making such intermediates and for making said 1-[(1-, 2- and 3-indolyl)-lower-alkyl]-piperazines, 1-[(1-, 2- or 3-indolyl)-lower-alkyl]homopiperazines, 1 - [ω - (3-indolyl)-ω-hydroxy-lower-alkyl]-piperazines and 1-[ω-(3-indolyl)-ω-hydroxy-lower-alkyl]homopiperazines.

A preferred aspect of my invention relates to 1-substituted-2-piperazinones and 1-substituted-7-homopiperazinones useful as intermediates in the preparation of compounds having the formulae:

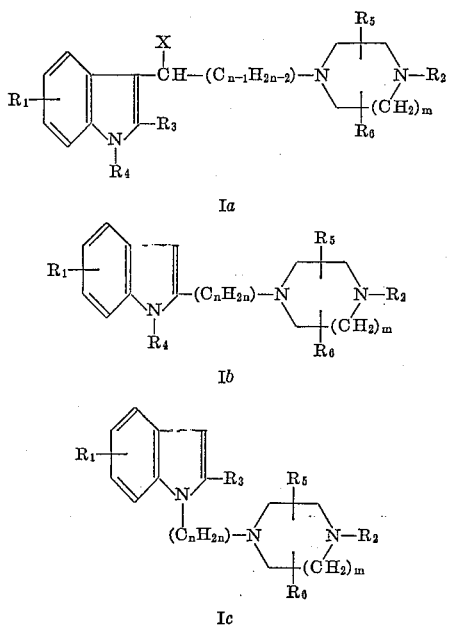

wherein $R_1$ is a hydrogen atom or one or more substituents selected from the group consisting of halogen (including fluorine, chlorine, bromine and iodine), lower-alkyl, lower-alkoxy, hydroxy, methylenedioxy, ethylenedioxy, lower-alkylmercapto, lower-alkylsulfinyl, lower-alkyl-sulfonyl, trifluoromethyl, monocarbocyclic, aryl-lower-alkoxy and lower-alkanoyloxy; $R_2$ is a hydrogen atom or a lower-alkyl, hydroxy-lower-alkyl, monocarbocyclic aryl monocarbocyclic aryl-lower-alkyl, bis(monocarbocyclic aryl)-lower-alkyl, monocarbocyclic aryl-lower-alkenyl or heteromonocyclic radical; $R_3$ is a hydrogen atom or a lower-alkyl or monocarbocyclic aryl radical; $R_4$ is a hydrogen atom or a lower-alkyl, monocarbocyclic aryl, monocarbocyclic aryl-lower-alkyl or a monocarbocyclic aryl-lower-alkenyl radical; $R_5$ and $R_6$ are hydrogen atoms or each of $R_5$ and $R_6$ can represent a lower-alkyl radical or one of $R_5$ and $R_6$ can represent a lower-alkyl radical while the other of $R_5$ and $R_6$ represents a hydrogen atom; X is a hydrogen atom or the hydroxyl radical and represents the hydroxyl radical only when the hydroxyl radical and the 1-nitrogen atom of the piperazine ring are separated by at least two carbon atoms, that is when $n$ in Formula Ia is at least 2; $n$ represents an integer from one to seven; and $m$ represents the integers 1 or 2.

In the above general Formulae Ia, b and c, $R_1$ represents a hydrogen atom or one or more substituents selected from the group consisting of halogen, lower-alkyl, lower-alkoxy, hydroxy, methylenedioxy, ethylenedioxy, lower-alkylmercapto, lower-alkylsulfinyl, lower-alkylsulfonyl, trifluoromethyl, monocarbocyclic aryl-lower-alkoxy and lower-alkanoyloxy. $R_1$ can represent from one to four of the above substituents which can be on any of the four available positions on the benzene ring, and when more than one substituent is present, they can be the same or different. When $R_1$ represents a lower-alkyl, lower-alkoxy, lower-alkylmercapto, lower-alkylsulfinyl, lower-alkylsulfonyl or lower-alkanoyloxy radical, it can be either straight or branched and can contain from one to about five carbon atoms, and when $R_1$ represents a monocarbocyclic aryl-lower-alkoxy radical, it can contain from seven to about ten carbon atoms and can be further substituted by from one to three substituents of the nature named above, i.e., halogen, lower-alkyl, lower-alkoxy, hydroxy, methylenedioxy, ethylenedioxy, lower-alkylmercapto, lower-alkylsulfinyl, lower-alkylsulfonyl, trifluoromethyl and lower-alkanoyloxy. $R_1$ thus stands, inter alia, for fluoro, chloro, bromo, iodo, methyl, ethyl, butyl, methoxy, dimethoxy, trimethoxy, ethoxy, ethoxy-methoxy, butoxy, hydroxy, methylenedioxy, ethylenedioxy, methylmercapto, isopropylmercapto, methylsulfinyl, isopropylsulfinyl, methylsulfonyl, isopropylsulfonyl, trifluoromethyl, benzyloxy, 3,4,5-trimethoxybenzyloxy, acetoxy or isobutyryloxy.

In the above general formulae, Ia, b and c, $R_2$ represents a hydrogen atom or a lower-alkyl, hydroxy-lower-alkyl, monocarbocyclic aryl, monocarbocyclic aryl lower-alkyl, bis(monocarbocyclic aryl)-lower-alkyl, monocarbocyclic aryl-lower-alkenyl or heteromonocyclic radical; $R_3$ represents a hydrogen atom or a lower-alkyl or monocarbocyclic aryl radical; and $R_4$ represents a hydrogen atom or a lower-alkyl, monocarbocyclic aryl, monocarbocyclic aryl-lower-alkyl or monocarbocyclic aryl-lower-alkenyl radical. When $R_2$, $R_3$ or $R_4$ represents a lower-alkyl radical, it can be straight or branched and can contain from one to about six carbon atoms. $R_2$, $R_3$ and $R_4$ thus stand, inter alia, for methyl, isopropyl, isobutyl or n-hexyl.

When $R_2$ represents an hydroxy-lower-alkyl radical, it can be straight or branched, can contain from two to about six carbon atoms and is such that the oxygen and nitrogen atoms are separated by at least two carbon atoms. $R_2$ thus also stands, inter alia, for 2-hydroxyethyl, 3-hydroxy-1-methylpropyl or 6-hydroxyhexyl.

When $R_2$, $R_3$ or $R_4$ represents a monocarbocyclic aryl radical, or when $R_2$ or $R_4$ represents a monocarbocyclic aryl-lower-alkyl or a monocarbocyclic aryl-lower-alkenyl radical or when $R_2$ represents a bis(monocarbocyclic aryl)-lower-alkyl radical, each lower-alkyl and lower-alkenyl moiety of said radicals can contain up to about four carbon atoms and each monocarbocyclic aryl moiety of said radicals can be further substituted as will be hereinafter described and each monocarbocyclic aryl moiety, together with said substituents, can contain from six to about twelve carbon atoms. The monocarbocyclic aryl moiety can thus be phenyl or phenyl substituted by one or more substituents selected from the group consisting of halogen (including fluorine, chlorine, bromine and iodine), lower-alkyl, hydroxy, lower-alkoxy, methylenedioxy, ethylenedioxy, lower-alkylmercapto, lower-alkylsulfinyl, lower-alkylsulfonyl and trifluoromethyl. When the monocarbocyclic aryl moiety is substituted by more than one of the above substituents, the substituents can be the same or different and can occupy any of the available positions on the phenyl ring. When the substituent is a lower-alkyl, lower-alkoxy, lower-alkylmercapto, lower-alkylsulfinyl or lower-alkylsulfonyl group, said substituents can be either straight or branched and can contain from one to about four carbon atoms. Thus when $R_2$, $R_3$ or $R_4$ represents a monocarbocycic aryl, monocarbocyclic aryl-lower-alkyl, bis(monocarbocyclic aryl)-lower-alkyl or a monocarbocyclic aryl-lower-alkenyl radical, each of $R_2$, $R_3$ and $R_4$ can represent such organic radicals, inter alia, as phenyl, benzyl, phenethyl, 4-phenylbutyl, benzhydryl or cinnamyl or such organic radicals substituted in the phenyl ring by one or more of such substituents, inter alia, as fluoro, chloro, bromo, iodo, methyl, isobutyl, hydroxy, methoxy, n-butoxy, methylenedioxy, ethylenedioxy, methylmercapto, isoproplmercapto, methylsulfinyl, isopropylsulfinyl, methylsulfonyl, isopropylsulfonyl or trifluoromethyl.

In the above general Formulae I$a$, $b$ and $c$ when $R_2$ represents a heteromonocyclic radical, it can represent a heteromonocyclic radical containing one or more heteroatoms such as nitrogen, oxygen or sulfur. Thus $R_2$ also stands, inter alia, for pyrimidyl, pyrazinyl, pyridyl, thiazolyl, oxazolyl, 1,3,5-triazinyl, thienyl, and the like.

In the above general Formulae I$a$, $b$ and $c$, $R_5$ and $R_6$ represent hydrogen atoms or each of $R_5$ and $R_6$ can represent a lower-alkyl radical or one of $R_5$ and $R_6$ can represent a lower-alkyl radical while the other of $R_5$ and $R_6$ represents a hydrogen atom. When $R_5$ and $R_6$ represent lower-alkyl radicals, they can contain from one to about three carbon atoms, can be straight or branched and can occupy either the 2-, 3-, 5- or 6-position of the piperazine ring or the 2-, 3-, 5-, 6- or 7-positions of the homopiperazine ring. $R_5$ and $R_6$ thus stand for hydrogen, methyl, ethyl, n-propyl or isopropyl.

In the above general Formulae I$a$, $b$ and $c$, $n$ represents an integer from one to seven and, in Formula I$a$ when X is a hydroxyl radical, must be at least two. The lower-alkylene group, $C_nH_{2n}$, can be straight or branched and stands, inter alia, for methylene, ethylene, propylene, butylene, 2-methylpropylene, 2-methylbutylene, 2-ethylbutylene, 2-ethylpentylene and the like.

The compounds of Formulae I$a$, $b$ and $c$ can be prepared by the following reactions in which $R_1$, $R_2$, $R_3$, $R_4$, $R_5$, $R_6$, X, $n$ and $m$ have the meanings given above, except that $R_2$ does not represent a hydrogen atom and Hal represents a halogen atom and Alk represents a lower-alkyl radical. The compounds of Formulae I$a$, $b$ and $c$ where $R_2$ represents a hydrogen atom are prepared in a manner as will be hereinafter described.

*Method A*

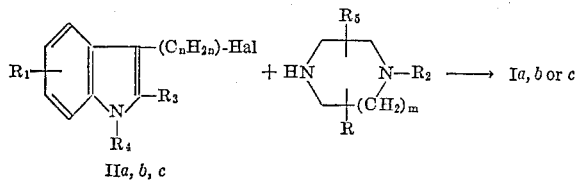

*Method B*

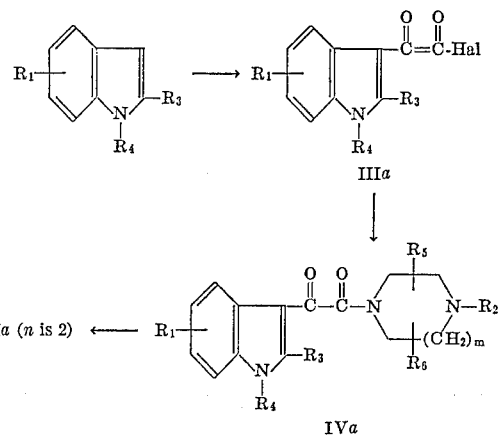

*Method C*

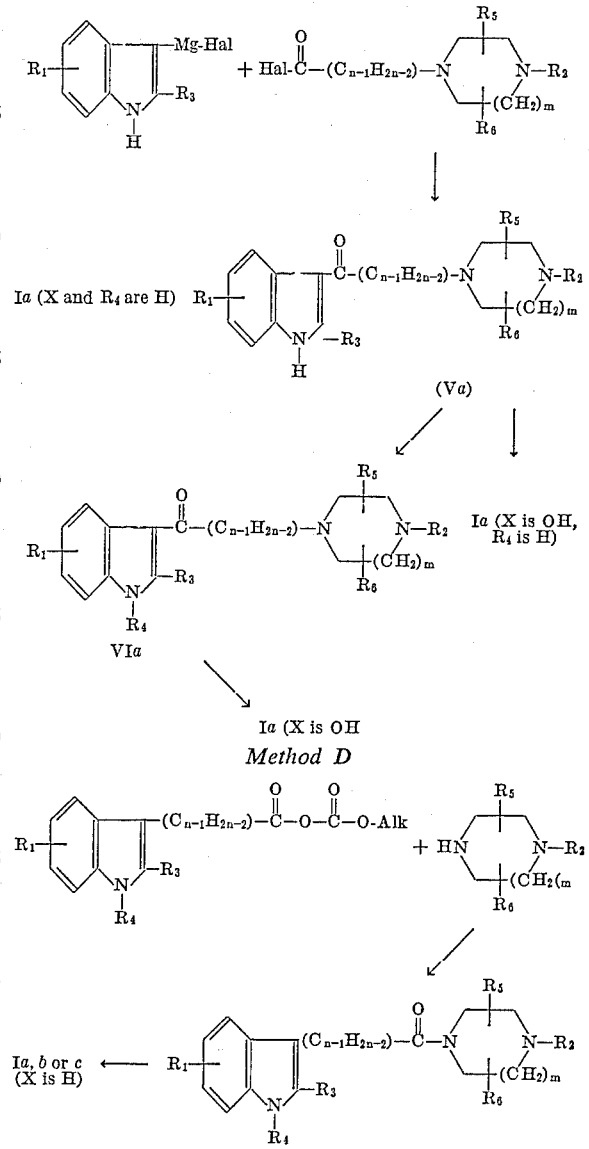

Method A above can be used to prepare 1-[(1-, 2- and 3-indolyl)-lower-alkyl]-4-substituted - piperazines and 1-[(1-, 2- and 3-indolyl)-lower-alkyl]-4-substituted-homopiperazines of Formulae Ia, b or c where X in Formula Ia is a hydrogen atom. The intermediate indolyl-lower-alkyl halides of Formulae IIa, b or c, used as starting materials in Method A above, are prepared by reduction of an indolyl 2- or 3-carboxylic acid or an indole 1-, 2-, or 3-alkanoic acid with lithium aluminum hydride and conversion of the resulting alcohol to the corresponding halide by reacting the former with, for example, a phosphorus trihalide or a thionyl halide. The (1-, 2- and 3-indolyl)-lower-alkyl halides thus produced are reacted with an appropriate 1-substituted-piperazine or 1-substituted-homopiperazine at a temperature between about 15° C. and 150° C. in the presence of an acid-acceptor. The reaction is preferably carried out in an organic solvent, inert under the conditions of the reaction, such as anhydrous ethanol, benzene, xylene and the like. The purpose of the acid-acceptor is to take up the hydrogen halide which is split out during the course of the reaction. The acid-acceptor is a basic substance which forms water soluble by-products easily separable from the main product of the reaction and includes such substances as alkali metal salts of weak acids, e.g., sodium carbonate, sodium bicarbonate, potassium carbonate, sodium acetate, sodium alkoxides, and the like. The acid-acceptor can also be in the form of an excess quantity of the 1-substituted-piperazine or 1-substituted-homopiperazine.

The compounds of Formula Ia where X is H and $n$ is at least 2 can also be prepared by reacting an indole with a 1-($\omega$-hydroxy-lower-alkyl)-4-substituted piperazine or a 1-($\omega$-hydroxy-lower-alkyl)-4-substituted - homopiperazine in the presence of a Raney nickel catalyst. The reaction is preferably carried out in an organic solvent inert under the conditions of the reaction, such as xylene, cymene or di-n-butyl ether, and the like.

Method B above can be used to prepare 1-[2-(3-indolyl)-ethyl]-4-substituted-piperazines, 1-[2-(3 - indolyl) ethyl]-4-substituted-homopiperazines, 1-[2-(3-indolyl) - 2-hydroxyethyl]-4-substituted-piperazines and 1-[2-(3-indolyl)-2-hydroxyethyl]-4 - substituted - homopiperazines, i.e., compounds of Formula Ia where $n$ is 2 and X is a hydrogen atom or a hydroxyl radical. The intermediate indoles used as starting materials in Method B above are prepared by known methods, for example by the Fischer indole synthesis using an appropriate substituted phenylhydrazine and a methyl lower-alkyl ketone or a methyl monocarbocyclic aryl ketone. Alternatively the starting indoles can be prepared by catalytic reduction of a $\beta$,2-dinitrostyrene. The indoles thus prepared are reacted with a glyoxalyl halide at a temperature in the range from about $-20°$ C. to $25°$ C. in an organic solvent inert under the conditions of the reaction, such as ether, petroleum ether, dioxane, tetrahydrofuran and the like, thus affording the 3-(indolyl)-glyoxalyl halides of Formula IIIa. A preferred solvent is ether. The 3-(indolyl) glyoxalyl halides of Formula IIIa thus prepared are then reacted with a 1-substituted-piperazine or a 1-substituted-homopiperazine at a temperature between about $-5°$ C. and about $65°$ C. in the presence of an acid-acceptor to give the 1 - [(3-indolyl)-glyoxalyl]-4-substituted-piperazines and 1 - [(3-indolyl)glyoxalyl]-4-substituted-homopiperazines of Formula IVa. The reaction is preferably carried out in an organic solvent, inert under the conditions of the reaction, such as tetrahydrofuran, ether, ethylene dichloride and the like. The purpose of the acid-acceptor is to take up the hydrogen halide which is split out during the course of the reaction. The acid-acceptor is a basic substance which forms water-soluble by-products easily separable from the main product of the reaction and includes such substances as alkali metal salts of weak acids, e.g., sodium carbonate, sodium bicarbonate, potassium carbonate, sodium acetate, and the like. The acid-acceptor can also be in the form of an excess quantity of the 1-substituted-piperazine or 1-substituted-homopiperazine. A preferred solvent is tetrahydrofuran and it is preferred to use an excess quantity of the 1-substituted-piperazine or 1-substituted-homopiperazine as the acid-acceptor. The 1-[(3-indolyl)glyoxalyl]-4-substituted-piperazines and 1-[(3-indolyl)glyoxalyl]-4-substituted-homopiperazines thus prepared are reacted with an alkali metal aluminum hydride at a temperature between about $0°$ C. and about $65°$ C. in an organic solvent inert under the conditions of the reaction, for example, ether or tetrahydrofuran. It is preferred to use lithium aluminum hydride in refluxing tetrahydrofuran.

Method B affords compounds of Formula I where the piperazinyl-lower-alkyl, homopiperazinyl-lower-alkyl, piperazinyl-$\omega$-hydroxy-lower-alkyl or homopiperazinyl - $\omega$-hydroxy-lower-alkyl group is attached to the 3-position of the indole nucleus. When $R_4$ in compounds of Formula IVa is a hydrogen atom, the main product is a 1-[2-(3-indolyl)ethyl]-4-substituted-piperazine or a 1-[2-(3 - indolyl)ethyl]-4-substituted-homopiperazine, i.e., Ia, wherein X is H and $n$ is 2, although it is possible to obtain both 1-[2-(3-indolyl)-2-hydroxyethyl]-4 - substituted - piperazines or 1-[2-(3-indolyl)-2-hydroxyethyl]-4-substituted-homopiperazines and 1-[2-(3-indolyl)ethyl]-4-substituted-piperazines or 1-[2-(3-indolyl)ethyl]-4-substituted-homopiperazines. However, when $R_4$ in compounds of Formula IVa is a lower-alkyl, monocarbocyclic aryl, monocarbocyclic aryl-lower-alkyl or a monocarbocyclic aryl-lower-alkenyl radical, the only products obtained on reduction with an alkali metal aluminum hydride are the corresponding 1-[2-(3-indolyl)-2-hydroxyethyl]-4 - substituted-piperazines and 1-[2-(3-indolyl)-2-hydroxyethyl]-4-substituted-homopiperazines, i.e., Ia, X is OH. It is nevertheless possible to obtain 1-[$\omega$-(3-indolyl) - $\omega$ - hydroxy-lower-alkyl]-4-substituted-piperazines and 1-[$\omega$-(3-indolyl)-$\omega$-hydroxy-lower-alkyl]-4 - substituted - homopiperazines of Formula Ia wherein $R_4$ is H by another method as will be hereinafter described.

Method C can also be used to prepare compounds of general Formula Ia where the piperazinyl-$\omega$ - hydroxy-lower-alkyl group, homopiperazinyl-$\omega$-hydroxy - lower-alkyl group, piperazinyl-lower-alkyl group or the homopiperazinyl-lower-alkyl group is attached to the 3-position of the indole nucleus. The starting indole Grignard reagent is prepared by reacting an indole having no substituent in the 1-position of the indole nucleus with a lower-alkylmagnesium halide in an appropriate organic solvent, for example ether or tetrahydrofuran, and reacting the resulting indolemagnesium halide with a 4-substituted-1-piperazinyl-lower-alkanoyl halide or a 4-substituted-1-homopiperazinyl-lower-alkanoyl halide to give the 1-[$\omega$-(3-indolyl)-$\omega$-keto-lower-alkyl]-4-substituted - piperazines and 1-[$\omega$-(3-indolyl)-$\omega$-keto-lower-alkyl]-4-substituted-homopiperazines of Formula Va. The latter on reaction with an alkali metal aluminum hydride as described above, preferably lithium aluminum hydride, afford 1-[$\omega$-(3-indolyl)-lower-alkyl]-4-substituted - piperazines and 1-[$\omega$-(3-indolyl)-lower-alkyl]-4 - substituted-homopiperazines of Formula Ia where X and $R_4$ are hydrogen atoms. However, on reaction of the 1-[$\omega$-(3-indolyl)-$\omega$-keto-lower-alkyl]-4-substituted-piperazines or the 1-[$\omega$-(3-indolyl)-$\omega$-keto-lower-alkyl]-4-substituted - homopiperazines of Formula Va with an alkali metal borohydride, 1-[$\omega$-(3-indolyl)-$\omega$-hydroxy-lower-alkyl]-4 - substituted-piperazines and 1-[$\omega$(3-indolyl)-$\omega$-hydroxy-lower-alkyl]-4-substituted-homopiperazines can be obtained, i.e., Ia, X is OH, $R_4$ is H. The reaction is preferably carried out in an organic solvent inert under the conditions of the reaction, for example methanol, ethanol, ether, tetrahydrofuran and the like. Alternatively, the compounds of Formula Va can be reacted with a lower-alkyl halide, a monocarbocyclic aryl-lower-alkyl halide or a monocarbocyclic aryl-lower-alkenyl halide in the presence of an acid-acceptor to give the 1-[$\omega$-(3-indolyl)-$\omega$-keto-lower-alkyl]-4-substituted-piperazines and the 1-[$\omega$-(3-indolyl)-$\omega$-ketolower-alkyl]-4-substituted-homopiperazines of Formula VI*a* where R₄ is not a hydrogen atom. The purpose of the acid-acceptor is to take up the hydrogen halide which is split out during the course of the reaction. The reaction is preferably carried out in liquid ammonia in the presence of an alkali metal amide, for example, sodium amide. The compounds of Formula VI*a* thus prepared can then be reacted with an alkali metal aluminum hydride or an alkali metal borohydride as described above, preferably lithium aluminum hydride or sodium borohydride, to give 1-[ω-(3-indolyl)-ω-hydroxy-lower-alkyl]-4-substituted-piperazines and 1-[ω-(3-indolyl)-ω-hydroxy-lower-alkyl]-4 - substituted-homopiperazines of Formula I*a* where X is OH.

Method D above can be used to prepare 1-[(1-, 2- and 3-indolyl)-lower-alkyl]-4-substituted - piperazines and 1-[(1-, 2- and 3-indolyl)-lower-alkyl]-4-substituted-homopiperazines of Formulae I*a*, *b* or *c* where X is H and *n* is an integer from one to seven. The intermediate mixed anhydrides used as starting material are prepared by reacting a 1-, 2- or 3-indolyl-lower-alkanoic acid or a 2- or 3-indolecarboxylic acid with a lower-alkyl-haloformate in the presence of an acid-acceptor, for example triethylamine, at a temperature between about —20° C. to about 20° C. The reaction is preferably carried out in an organic solvent inert under the conditions of the reaction such as anhydrous acetone, ether, ethylene dichloride and the like. Acetone is the preferred solvent. The purpose of the acid-acceptor is to take up the hydrogen halide split out during the course of the reaction and is a basic substance which forms water-soluble by-products easily separable from the product. The indolyl-lower-alkane mixed anhydrides of the 1-, 2- and 3-indole-lower-alkanoic acids, and the 2-indolecarboxylic acids and 3-indolecarboxylic acids thus formed in situ are reacted with an appropriate 1-substituted-piperazine or 1-substituted-homopiperazine at a temperature between about —20° C. and about 20° C. to give the 1-[(1-, 2- and 3-indolyl)-α-keto-lower-alkyl]-4-substituted-piperazines, 1-[(1-, 2- and 3-indolyl)-α-keto-lower-alkyl]-4-substituted - homopiperazines, 1-(2-indolylcarbonyl)-4-substituted-piperazines, 1-(2-indolylcarbonyl)-4-substituted-homopiperazines, 1- (3-indolylcarbonyl)-4-substituted-piperazines and the 1-(3-indolylcarbonyl)-4-substituted-homopiperazines of Formulae VII*a*, *b* and *c*. The latter on reaction with an alkali metal aluminum hydride as described above, preferably lithium aluminum hydride, afford compounds of Formulae I*a*, *b* or *c* wherein X is H and *n* is an integer from one to seven.

Alternatively the 1-[(3-indolyl)-α-keto-lower-alkyl]-4-substituted-piperazines and 1-[(3-indolyl)-α-keto - lower-alkyl]-4-substituted - homopiperazines of Formula VII*a* where R₄ is hydrogen can be prepared by reacting an indole having no substituent in the 1-position of the indole nucleus with a lower-alkyl magnesium halide in an appropriate organic solvent, for example ether or tetrahydrofuran, and reacting the resulting indole magnesium halide with a 1-(halo-lower-alkanoyl)-4-substituted-piperazine or a 1-(halo-lower-alkanoyl)-4-substituted - homopiperazine thus producing the compounds of Formula VII*a* where R₄ is hydrogen and *n* is an integer from two to seven.

Method E above can be used to prepare 1-[(3-indolyl)-methyl]-4-substituted-piperazines and 1-[(3-indolyl)methyl]-4-substituted-homopiperazines, that is, compounds of Formula I*a* where X is H and *n* is 1. The 1-[(3-indolyl) methyl]-4-substituted-piperazines and 1 - [(3 - indolyl) methyl]-4-substituted-homopiperazines are prepared by reacting an indole with formaldehyde and an appropriate 1-substituted-piperazine or 1-substituted-homopiperazine at a temperature between about 50° C. and about 150° C. The formaldehyde can be in the form of an aqueous solution, i.e., 40% formalin solution, or a polymeric form of formaldehyde such as paraformaldehyde or trioxymethylene. When such polymeric forms are used, a molar excess of mineral acid such as hydrochloric acid, is added to regenerate the free aldehyde from the polymer. The reaction is preferably carried out in an organic solvent, inert under the conditions of the reaction, such as ethanol, methanol or 3-methylbutanol.

The compounds of Formulae I*a*, *b* or *c* where R₂ is a hydrogen atom are prepared by reacting with hydrogen in the presence of a catalyst the 1-[(1-, 2- and 3-indolyl)-lower-alkyl]piperazines, 1-[(1-, 2- and 3-indolyl)-lower-alkyl]homopiperazines, 1-[ω-(3-indolyl) - ω - hydroxy-lower-alkyl]piperazines or 1-[ω-(3-indolyl)-ω - hydroxy-lower-alkyl]homopiperazines of Formulae I*a*, *b* or *c* in which the piperazine or homopiperazine ring bears attached to the 4-position a benzyl, benzhydryl or cinnamyl radical. The reaction is preferably carried out in the presence of a platinum or palladium catalyst in an organic solvent inert under the conditions of the reaction, for example ethanol, Cellosolve, benzene, toluene and the like and at hydrogen pressures in the range from about 30 p.s.i. to about 100 p.s.i. The benzyl, benzhydryl or cinnamyl radicals can be unsubstituted or substituted in the phenyl ring by substituents of the nature described above but which do not take part in or adversely affect the reaction thus excluding such substituents as those containing sulfur, for example lower-alkyl-mercapto, or halogen. A preferred catalyst is palladium-on-charcoal and a preferred solvent is ethanol.

A synthetic procedure which provides access to compounds of Formulae I*a*, *b* and *c* wherein R₅ and/or R₆ is hydrogen or a lower alkyl radical is illustrated below by the following reactions wherein R₁, R₂, R₃, R₄, R₅, R₆, *n*, *m* and Hal have the meanings given above except that R₂ does not represent hydrogen:

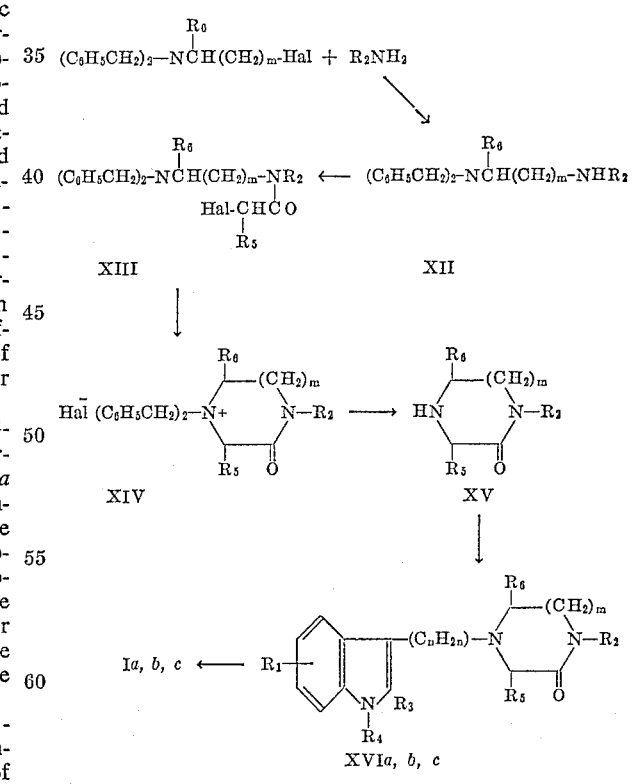

An N-(β- or γ-halo-lower-alkyl)-N,N-dibenzylamine is reacted with a primary amine, R₂NH₂, at a temperature between about 50° C. and about 150° C. in the presence of an acid-acceptor. The reaction is preferably carried out in an organic solvent, inert under the conditions of the reaction, such as anhydrous ethanol, benzene, xylene, 2-ethoxyethanol (Cellosolve), and the like. The nature of the acid-acceptor is the same as that described above in the preparation of 1-[(1-, 2- and 3-indolyl)-lower-alkyl]-4-substituted-piperazines and 1-[(1-, 2- and 3-indolyl)-lower-alkyl] - 4 - substituted - homopiperazines using Method A. The lower-alkyl radical, which in an ethylene radical when $m$ is 1 or a propylene radical when $m$ is 2, can be further substituted by a straight or branched lower-alkyl radical, $R_6$, and the lower-alkyl radical, $R_6$, can occupy any of the carbon atoms of the ethylene or propylene radical, although for the purpose of illustration only it is shown above on the carbon atom adjacent to the tertiary amino group. The compounds of Formula XII thus produced wherein $R_6$ is attached to the carbon atom adjacent to the tertiary amino group afford compounds of Formulae I$a$, $b$ or $c$ wherein the lower-alkyl radical, $R_6$, is attached to the 2-position of the piperazine ring or the 7-position of the homopiperazine ring. Compounds of Formulae I$a$, $b$ or $c$ wherein the lower-alkyl radical is attached to the 3-position of the piperazine ring or the 6-position of the homopiperazine ring are obtained from compounds of Formula XII where $R_6$ is attached to the $\beta$-carbon atom of the ethylene or propylene radical, respectively, and the compounds of Formulae I$a$, $b$ or $c$ where the lower-alkyl radical, $R_6$, is attached to the 5-position of the homopiperazine ring are obtained from compounds of Formula XII where the lower-alkyl radical, $R_6$, is attached to the $\gamma$-carbon atom of the propylene radical (i.e., $m$ is 2). The homopiperazines can also be prepared by another method as will be hereinafter described.

The 1-(N,N-dibenzylamino)-2- or 3-(N'-substituted)-lower-alkylene-secondary amines of Formula XII thus produced are reacted with an $\alpha$- or $\beta$-halo-lower-alkanoyl halide at a temperature between about 0° C. and 90° C. to give 1-(N,N-dibenzylamino)-2-[N'-($\alpha$- or $\beta$-halo-lower-alkanoyl) - N' - (substituted)]-lower-alkylenediamines represented by Formula XIII. The reaction can be carried out either with or without the use of an acid-acceptor and is preferably conducted in an organic solvent inert under the conditions of the reaction, for example, methylene dichloride, chloroform, ethylene dichloride, benzene and the like.

The resulting 1-(N,N-dibenzylamino)-2-[N'-($\alpha$- or $\beta$-halo-lower-alkanoyl) - N' - (substituted)]-lower-alkylenediamines of Formula XIII can be isolated and purified or if desired quaternized in the crude form by refluxing in an appropriate organic solvent inert under the conditions of reaction, for example ethanol, acetonitrile or Cellosolve. A preferred solvent is Cellosolve.

For the purpose of illustration only, an $\alpha$-halo-lower-alkanoyl halide is shown in the above-described reaction. However, by reacting a $\beta$-halo-lower-alkanoyl halide with ethylenediamine derivatives of Formula XII, the 1-benzyl-4-substituted-5-homopiperazinones corresponding to Formula XIV can be obtained. The $\alpha$- or $\beta$-halo-lower-alkanoyl halides can be straight or branched and the $\beta$-halo-lower-alkanoyl halide can contain lower-alkyl radicals, $R_5$ or $R_6$, on either the $\alpha$- or the $\beta$-carbon atom. Thus, by proper choice of the $\alpha$- or $\beta$-halo-lower-alkanoyl halide, compounds of Formula XIV afford, as will be seen, compounds of Formulae I$a$, $b$ or $c$ where a lower-alkyl radical, $R_5$, is attached to the 2-position of the piperazine ring or to the 6- or 7-positions of the homopiperazine ring.

The 1-benzyl-4-substituted-3-piperazinone and 1-benzyl-4-substituted-5-homopiperazinone benzohalide quaternary ammonium salts of Formula XIV thus produced are catalytically debenzylated to the 1-substituted-2-piperazinones and 1-substituted-7-homopiperazinones, the compounds of the instant invention represented by Formula XV, by reacting the former with hydrogen in the presence of a catalyst at a temperature from about 20° C. to about 70° C. and under hydrogen pressures in the range from about 30 p.s.i. to about 70 p.s.i. The reaction is conducted in an organic solvent inert under the conditions of the reaction, for example methanol, ethanol, or 2-propanol. A preferred catalyst is palladium-on-charcoal and a preferred solvent is ethanol. The 1-substituted-2-piperazinones and 1-substituted-7-homopiperazinones of Formula XV can be isolated and purified in the form of the free base or if desired can be converted to an acid-addition salt for purposes of purification and characterization. Appropriate acid-addition salts are those derived from mineral acids as hydrochloric acid, hydrobromic acid, hydriodic acid, nitric acid, sulfuric acid and phosphoric acid; and organic acids such as acetic acid, citric acid, lactic acid, tartaric acid and p-toluenesulfonic acid.

The 1-substituted-2-piperazinones and 1-substituted-7-homopiperazinones thus produced can then be reacted, for example, with a (1-, 2- or 3-indolyl)-lower-alkyl halide according to the procedure of Method A above and the resulting 1-[(1-, 2- and 3-indolyl)-lower-alkyl]-4-substituted-3-piperazinone or 1-[(1-, 2- and 3-indolyl)-lower-alkyl]-4-substituted-5-homopiperazinone reacted with an alkali metal aluminum hydride to produce the 1-[(1-, 2- or 3-indolyl)-lower-alkyl]-4-substituted-piperazines or 1-[(1-, 2- or 3-indolyl)-lower-alkyl] - 4 - substituted-homopiperazines of Formulae I$a$, $b$ and $c$.

Method A was chosen above for purposes of illustration only but it is to be understood that Methods B, C, D and E can be adapted to the above-described synthesis as well. That is, it is only necessary to substitute for the 1-substituted-piperazine and the 1-substituted-homopiperazine used in Methods A, B, D and E or the 4-substituted-1-piperazinyl-lower-alkanoyl halide and 4-substituted-1-homopiperazinyl-lower-alkanoyl halide used in Method C the corresponding 1-substituted-2-piperazinones and 1-substituted-7-homopiperazinones or the 1-(4-substituted-3-piperazinonyl)-lower-alkanoyl halide and 1-(4-substituted-5-homopiperazinonyl)-lower-alkanonyl halide, respectively, and proceed as described above. Thus in addition to the 1-[(1-, 2- and 3-indolyl)-lower-alkyl]-4-substituted-3-piperazinones and 1-[(1-, 2- and 3-indolyl)-lower - alkyl]-4-substituted-5-homopiperazinones afforded by Method A, there can also be obtained 1-[(3-indolyl)glyoxalyl]-4-substituted - 3 - piperazinones and 1-[(3-indolyl)glyoxalyl]-4-substituted - 5 - homopiperazinones by Method B, 1-[$\omega$-(3-indolyl)-$\omega$-keto-lower-alkyl]-4-substituted-3-piperazinones and 1-[$\omega$-(3-indolyl)-$\omega$-keto-lower-alkyl]-4-substituted-5-homopiperazinones by Method C, 1-[(1-, 2- or 3-indolyl)-$\alpha$-keto-lower-alkyl]-4-substituted-3-piperazinones and 1-[(1-, 2- or 3-indolyl)-$\alpha$-keto-lower-alkyl]-4-substituted-5-homopiperazinones by Method D and 1-[(3-indolyl)methyl]-4-substituted-3-piperazinones, 1-[(3-indolyl)methyl] - 4 - substituted-5-homopiperazinones by Method E. These on reaction with an alkali metal aluminum hydride afford, as the case may be, either the 1-[(1-, 2- and 3-indolyl)-lower-alkyl]-4-substituted-piperazines, 1-[(1-, 2- and 3-indolyl)-lower-alkyl]-4-substituted-homopiperazines, 1-[$\omega$-(3 - indolyl)-$\omega$-hydroxy-lower-alkyl]-4-substituted-piperazines or the 1-[$\omega$-(3-indolyl)-$\omega$-hydroxy-lower-alkyl]-4-substituted - homopiperazines of Formulae I$a$, $b$ and $c$.

An alternative procedure for the preparation of the 1-substituted-7-homopiperazinones of Formula XV that are obtained when a $\beta$-halo-lower-alkanoyl halide is reacted with an ethylene-diamine of Formula XII ($m$ is 1) comprises reacting a 1-substituted-4-piperidone with hydrazoic acid in the presence of a strong mineral acid, for example sulfuric acid, phosphoric acid or hydrochloric acid, and in an appropriate organic solvent inert under the conditions of the reaction, for example benzene, chloroform, trichloroethylene and the like. The hydrazoic acid can be in the form of a solution of hydrazoic acid in the solvent used or, if desired, in the form of an alkali metal salt, for example sodium azide. In the latter case, the alkali metal salt reacts with the mineral acid used to produce the hydrazoic acid in situ. The reaction is preferably carried out at a temperature in the range from about $-10°$ C. to 25° C. Preferred solvents are benzene and chloroform and a preferred acid is sulfuric acid.

The method is particularly preferred for the preparation of 1-substituted-homopiperazines corresponding to Formula XV where $R_5$ and $R_6$ are both hydrogen atoms. However, 1-substituted-homopiperazinones where $R_5$ and $R_6$ are both the same lower-alkyl radical are also prepared advantageously by this method from symmetrical 1-substituted-di-lower-alkyl-4-piperidones, such as 1-substituted-2,6-di-lower-alkyl-4-piperidones or 1-substituted-3,5-di-lower-alkyl-4-piperidones, since the racemic mixture of 1-substituted-di-lower-alkyl-5-homopiperazinones produced in the reaction give, on reduction with an alkali metal aluminum hydride, a racemic mixture of the same 1-substituted-di-lower-alkyl-homopiperazine. On the other hand, when 1-substituted mono-lower-alkyl-4-piperidones or unsymmetrical 1-substituted-di-lower-alkyl-4-piperidones are employed, for example a 1-substituted-2,5-di-lower-alkyl-4-piperidone, the mixture of products, on reduction with an alkali metal aluminum hydride, give isomeric 1-substituted-homopiperazines and thus necessitate a separation of the isomers before proceeding to the next step.

The compounds of Formula XV are useful in the free base form or in the form of acid-addition salts, and both forms are within the purview of the invention, and, in fact, are considered to be one and the same invention. The acid-addition salts are simply a more convenient form for use, and in practice, use of the salt form inherently amounts to use of the base form. Pharmacologically acceptable salts are salts whose anions are innocuous to the animal organism in pharmacodynamic doses of the salts, so that beneficial physiological properties inherent in the free bases are not vitiated by side-effects ascribable to the anions; in other words, the latter do not substantially affect the pharmacological properties inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, tartaric acid, methanesulfonic acid, benzenesulfonic acid, p-toluenesulfonic acid, sulfamic acid and quinic acid.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Although therapeutically acceptable salts are preferred, those having toxic anions are also useful. All acid-addition salts are useful as intermediates in purification of the free bases, and toxic acid-addition salts are useful as intermediates in preparing therapeutically acceptable salts by ion exchange procedures.

Pharmacological evaluation of the compounds of Formulae Ia, b and c has demonstrated that they possess a variety of depressant actions on the central and autonomic nervous system, the cardio-vascular system and the skeletal-muscular system. They lower the blood pressure; they decrease the incidence of vomiting induced by apomorphine; they lower the rectal temperature; they potentiate the sleeping time induced by ether, thiopental sodium or hexobarbital sodium; and they produce tranquilization and skeletal muscle relaxation. These results indicate their usefulness as hypotensive agents, antinauseants, antipyretics, sedatives, tranquilizers and skeletal muscle relaxants. The compounds can be prepared for use by dissolving under sterile conditions a salt form of the compounds in water (or an equivalent amount of a nontoxic acid if the free base is used), or in a physiologically compatible aqueous medium such as saline, and stored in ampules for intramuscular injection. Alternatively, they can be incorporated in tablet or capsule form for oral administration. They are formulated and used in the same way as known compounds having similar activities, such as chlorpromazine. The toxicity of the compounds of the invention is of the same order of magnitude as that of chlorpromazine.

The structures of the compounds of the invention have been established by the mode of synthesis and corroborated by chemical analysis.

The following examples will further illustrate the invention without the latter being limited thereto.

*Example 1*

1-phenyl-2-piperazinone [XV; $R_2$ is $C_6H_5$, $R_5$ and $R_6$ are H, $m$ is 1].—To a solution of 177 g. (0.5 mole) of 1-(N,N-dibenzylamino)-2-(N'-phenyl)ethylamine in 650 ml. of chloroform was aded 80 ml. (120 g., 1.0 mole) of α-chloroacetyl chloride. The resulting red solution was refluxed for five and a half hours. The solvent and the bulk of the excess acid chloride were removed in vacuo and the residue dissolved in chloroform once again and extracted with dilute sodium hydroxide. The organic extracts were dried and the solvent removed leaving 190 g. of crude 1-(N,N-dibenzylamino)-2-(N'-α-chloroacetyl-N'-phenyl)ethylamine. The oil was taken into hot Cellosolve and the solution refluxed for four hours. The cooled solution was diluted to a volume of 650 ml. with absolute ethanol. The resulting solution of 1-benzyl-4-phenyl-3-piperazinone benzo-chloride was divided into two portions and each reduced over 2 g. of 10% palladium-on-charcoal under 50 p.s.i. of hydrogen. Reduction in each case was essentially complete in about six hours. The solutions were combined and treated with excess alcoholic hydrochloric acid and diluted strongly with ether. The resulting solid which separated was collected and dried giving 91 g. of crude 1-phenyl-2-piperazinone hydrochloride. The hydrochloride salt was converted to the free base by treatment with alkali and the crude base sublimed at reduced pressure and recrystallized from ethyl acetate giving 1-phenyl-2-piperazinone, M.P. 100–105° C. (uncorr.).

*Analysis*.—Calcd. for $C_{10}H_{12}N_2O$: C, 68.15; H, 6.87; N, 15.90. Found: C, 68.27; H, 7.07; N, 15.77.

A small amount of the base was converted to the p-toluene-sulfonic acid salt giving 1-phenyl-2-piperazinone p-toluenesulfonate, M.P. 220.2–224.6° C. (corr.).

*Analysis*.—Calcd. for $C_{10}H_{12}N_2O.C_7H_8O_3S$: N, 8.04; S, 9.20. Found: N, 801; S, 9.07.

1-phenyl-2-piperazinone can be reacted with hydrobromic acid, hydriodic acid, nitric acid, sulfuric acid, phosphoric acid, acetic acid, citric acid, lactic acid, tartaric acid or p-toluenesulfonic acid to give the hydrobromide, hydriodide, nitrate, sulfate (or bisulfate), phosphate (or acid phosphate), acetate, citrate (or acid citrate), lactate, tartrate (or bitartrate) or p-toluenesulfonate salts, respectively.

*Example 2*

1-(4-chlorophenyl)-2-piperazinone hydrochloride [XV; $R_2$ is 4-$ClC_6H_4$, $R_5$ and $R_6$ are H, $m$ is 1] was prepared from 38.7 g. (0.1 mole) of N-(4-chlorophenyl)-N',N'-dibenzylethylenediamine and 22.5 g. (0.2 mole) of α-chloroacetyl chloride in chloroform according to the manipulative procedure described above in Example 1. There was thus obtained the intermediate 1-(N,N-dibenzylamino)-2-[N'-(α-chloroacetyl)-N'-(4 - chlorophenyl)]ethylamine hydrochloride, M.P. 161.0–163.8° C. (corr.).

*Analysis*.—Calcd. for $C_{24}H_{24}Cl_2N_2O.HCl$: N, 6.04; Cl, 22.93. Found: N, 5.94; Cl, 22.90.

The latter was converted to the free base, quaternized in boiling Cellosolve and the resulting quaternary salt debenzylated over a palladium-on-charcoal catalyst according to the manipulative procedure described above in Example 1. There was thus obtained 1-(4-chlorophenyl)-2-piperazinone hydrochloride, M.P. 192.8–194.8° C. (corr.).

*Analysis*.—Calcd. for $C_{10}H_{11}ClN_2O.HCl$: C, 48.60; H, 4.90; N, 11.34. Found: C, 48.37; H, 5.10; N, 11.05.

*Example 3*

1-(2,6-dimethylphenyl)-2-piperazinone hydrochloride [XV; $R_2$ is 2,6-$(CH_3)_2C_6H_3$, $R_5$ and $R_6$ are H, $m$ is 1] was prepared from 68.8 g. (0.2 mole) of 1-(N,N-dibenzylamino)-2-[N'-(2,6-dimethylphenyl)]-ethylamine and 45 g. (0.4 mole) of α-chloroacetyl chloride in 300 ml. of chloroform according to the manipulative procedure described above in Example 1. Catalytic debenzylation of the quaternary ammonium salt was interrupted after the uptake of one mole of hydrogen, and there was thus obtained the intermediate 4-benzyl-1-(2,6-dimethylphenyl)-2-piperazinone hydrochloride, M.P. 248.8–264.8° C. (corr.).

*Analysis.*—Calcd. for $C_{19}H_{22}N_2O \cdot HCl$: Cl, 10.72; N, 8.47. Found: Cl, 10.58; N, 8.50.

On continued reduction of the above 4-benzyl-1-(2,6-dimethylphenyl)-2-piperazinone hydrochloride over palladium-on-charcoal, there was obtained 1-(2,6-dimethylphenyl)-2-piperazinone hydrochloride, M.P. 224.8–226.0° C. (corr.).

*Analysis.*—Calcd. for $C_{12}H_{16}N_2O \cdot HCl$: Cl, 14.73; N, 11.64. Found: Cl, 14.66; N, 11.54.

*Example 4*

1-phenyl-6-methyl-2-piperazinone [XV; $R_2$ is $C_6H_5$, $R_5$ is H, $R_6$ is 6-$CH_3$, $m$ is 1].—By following the manipulative procedure described above in Example 1 and by replacing the 1-(N,N-dibenzylamino)-2-(N'-phenyl)ethylamine used therein with a molar equivalent amount of 1-(N,N-dibenzylamino)-2-(N'-phenyl)propylamine, there can be obtained 1-phenyl-6-methyl-2-piperazinone.

*Example 5*

1-phenyl-3-isopropyl-2-piperazinone [XV; $R_2$ is $C_6H_5$, $R_5$ is 3-$CH(CH_3)_2$, $R_6$ is H, $m$ is 1].—By following the manipulative procedure described above in Example 1 and by replacing the α-chloroacetyl chloride used therein with a molar equivalent amount of α-chloroisovaleryl chloride, there can be obtained 1-phenyl-3-isopropyl-2-piperazinone.

*Example 6*

1-phenyl-3-methyl-7-homopiperazinone [XV; $R_2$ is $C_6H_5$, $R_5$ is H, $R_6$ is 3-$CH_3$, $m$ is 2].—By following the manipulative procedure described above in Example 1 and by replacing the 1-(N,N-dibenzylamino)-2-(N'-phenyl)ethylamine used therein with a molar equivalent amount of 2-(N,N-dibenzylamino)-4-(N'-phenyl)butylamine, there can be obtained 1-phenyl-3-methyl-7-homopiperazinone.

*Example 7*

1-phenyl-3,6-dimethyl-7-homopiperazinone [XV; $R_2$ is $C_6H_5$, $R_5$ is 6-$CH_3$, $R_6$ is 3-$CH_3$, $m$ is 2].—By following the manipulative procedure described above in Example 1 and by replacement of the 1-(N,N-dibenzylamino)-2-(N'-phenyl)ethylamine and the α-chloroacetyl chloride used therein by molar equivalent amounts of 2-(N,N-dibenzylamino)-4-(N'-phenyl)butylamine and α-chloropropionyl chloride, respectively, there can be obtained 1-phenyl-3,6-dimethyl-7-homopiperazinone.

*Example 8*

1-[2-(3-indolyl)ethyl]-4-phenyl-3-piperazinone [XVIa; $R_1$, $R_3$, $R_4$, $R_5$ and $R_6$ are H, $R_2$ is $C_6H_5$, $C_nH_{2n}$ is $CH_2CH_2$, $m$ is 1].—A solution of 3.52 g. (0.02 mole) of the 1-phenyl-2-piperazinone prepared above in Example 1, 5.0 g. (0.02 mole) of 2-(3-indolyl)ethyl bromide and 2.8 g. (0.02 mole) of anhydrous potassium carbonate in 30 ml. of acetonitrile was refluxed for five hours, then cooled, diluted with water and basified with dilute sodium hydroxide. The mixture was extracted with chloroform and the extracts dried and evaporated. The residual brown gummy material was recrystallized twice from methanol giving 2.4 g. of 1-[2-(3-indolyl)ethyl]-4-phenyl-3-piperazinone, M.P. 163.2–164.4° C. (corr.).

*Analysis.*—Calcd. for $C_{20}H_{21}N_3O$: C, 75.21; H, 6.63; N, 13.16. Found: C, 75.32; H, 6.56; N, 13.06.

*Examples 9–14*

By following the manipulative procedure described above in Example 8 and by replacing the 1-phenyl-2-piperazinone used therein with a molar equivalent amount of the 2-piperazinones corresponding to Formula XV prepared above in Examples 2–7, there can be obtained the respective compounds corresponding to Formula XVIa listed below in Table 1 where $R_1$, $R_3$ and $R_4$ in each is H and $C_nH_{2n}$ in each is $CH_2CH_2$.

TABLE 1

[Formula XVIa]

| Example | $R_2$ | $R_5$ | $R_6$ | $m$ |
|---|---|---|---|---|
| 9 | 4-$ClC_6H_4$ | H | H | 1 |
| 10 | 2,6-$(CH_3)_2C_6H_3$ | H | H | 1 |
| 11 | $C_6H_5$ | H | 6-$CH_3$ | 1 |
| 12 | $C_6H_5$ | 3-$CH(CH_3)_2$ | H | 1 |
| 13 | $C_6H_5$ | H | 3-$CH_3$ | 2 |
| 14 | $C_6H_5$ | 6-$CH_3$ | 3-$CH_3$ | 2 |

*Example 15*

1-[2-(3-indolyl)ethyl]-4-(2-methylphenyl)piperazine [Ia; $R_1$, $R_3$, $R_4$, $R_5$, $R_6$ and X are H, $R_2$ is 2-$CH_3C_6H_4$, $n$ is 2, $m$ is 1].—A solution of 41.5 g. (0.12 mole) of 1-[(3-indolyl)glyoxalyl]-4-(2-methylphenyl)-piperazine in 250 ml. of tetrahydrofuran was added over a ten minute period to a stirred suspension of 27 g. (0.72 mole) of lithium aluminum hydride in 300 ml. of tetrahydrofuran. The mixture was refluxed and stirred for six and a half hours and the excess lithium aluminum hydride then destroyed by the dropwise addition of 140 ml. of 10% sodium hydroxide solution. The mixture was filtered, the insoluble material was washed with boiling chloroform, and the filtrate dried over anhydrous sodium sulfate and concentrated to dryness. The residual light orange oil was crystallized from a benzene-hexane mixture giving 28.5 g. of 1-[2-(3-indolyl)ethyl]-4-(2-methylphenyl)piperazine, M.P. 124.2–126.4° C.

*Analysis.*—Calcd. for $C_{21}H_{25}N_3$: C, 78.96; H, 7.89; N, 13.16. Found: C, 79.05; H, 7.85; N, 13.10.

*Examples 16–22*

By reacting the compounds prepared above in Examples 8–14 with lithium aluminum hydride in an appropriate organic solvent, for example ether or tetrahydrofuran, according to the manipulative procedure described above in Example 15, there can be obtained the respective compounds of Formula Ia listed below in Table 2 where $R_3$, $R_4$ and X in each is H:

TABLE 2

[Formula Ia]

| Example | $R_1$ | $R_2$ | $R_5$ | $R_6$ | $n$ | $m$ |
|---|---|---|---|---|---|---|
| 16 | H | $C_6H_5$ | H | H | 2 | 1 |
| 17 | H | 4-$ClC_6H_4$ | H | H | 2 | 1 |
| 18 | H | 2,6-$(CH_3)_2C_6H_3$ | H | H | 2 | 1 |
| 19 | H | $C_6H_5$ | H | 6-$CH_3$ | 2 | 1 |
| 20 | H | $C_6H_5$ | 3-$CH(CH_3)_2$ | H | 2 | 1 |
| 21 | H | $C_6H_5$ | H | 3-$CH_3$ | 2 | 2 |
| 22 | H | $C_6H_5$ | 6-$CH_3$ | 3-$CH_3$ | 2 | 2 |

The compounds of Formulae Ia, b and c when administered orally to mice to which 40 mg./kg. of hexobarbital had been administered produced potentiation of hexobarbital-induced sleeping time. They produced tranquilization of mice when given orally as shown by their reaction to being touched lightly on the vibrissae (head withdrawal reflex). When administered orally in mice, they showed adrenolytic activity as evidenced by antagonism of the pressor effects of epinephrine. Further evidence of tranquilizing and C.N.S. depressant activity for the compounds was shown by overt behavior studies in monkeys (oral) in which the compounds produced a taming effect, sedation, skeletal muscle relaxation, hypothermia and catalepsy.

Oral toxicity studies in mice have shown that the $LD_{50}$ of the compounds is in the range from about 110 mg./kg.

to about 4000 mg./kg. where $LD_{50}$ is defined as the dose fatal to 50% of the animals at that particular dose level.

The compounds of the present invention represented by Formula XV, in addition to being useful as intermediates for the preparation of the compounds of Formulae Ia, b and c, have also been shown to possess a depressant action on the central nervous system. They protect mice from the hind limb extensor component of maximal electroshock seizures. These results indicate their usefulness as central nervous system depressants, and in particular as anticonvulsant agents. Thus 1-(2,6-dimethylphenyl)-2-piperazinone hydrochloride, prepared above in Example 3, protected seven out of ten mice for one hour against electroshock-induced convulsions at a dose of 400 mg./kg.

The compounds of Formulae Ia, b and c can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further, the compounds can be formulated for oral administration in aqueous alcohol, glycol or oil solutions or oil-water-emulsions in the same manner as conventional medicinal substances are prepared. When used as hypotensive agents they are formulated and used in the same manner as conventional hypotensive agents, such as reserpine preparations, and indeed can be used advantageously in combination with such hypotensive agents.

When the compounds of Formula XV are used as anticonvulsant agents, they can be prepared for oral administration in solid form either with or without the aid of a carrier. Thus, the compounds can be formulated in unit dosage form as tablets in combination with a suitable adjuvant such as one or more of the following: calcium carbonate, starch, gelatin, talc, magnesium stearate, acacia, and the like; or alternatively, they can be employed in capsule form either alone or admixed with an adjuvant. Alternatively, the compounds can be formulated for oral administration as an aqueous suspension, aqueous alcohol solutions, oil solutions, or oil-water emulsions, in the same manner in which conventional medicinal substances are formulated.

This application is a division of my co-pending United States patent application Serial No. 842,203, filed September 25, 1959.

I claim:
1. A member of the group consisting of (A) compounds having the formula

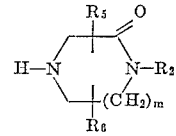

wherein $R_2$ is a member of the group consisting of lower-alkyl, hydroxy-lower-alkyl, monocarbocyclic aryl, monocarbocyclic aryl-lower-alkyl, bis-(monocarbocyclic aryl)-lower-alkyl, monocarbocyclic aryl-lower-alkenyl, pyrimidyl, pyrazinyl, pyridyl, thiazolyl, oxazolyl, 1,3,5-triazinyl, and thienyl; $R_5$ and $R_6$ each represent a member of the group consisting of a hydrogen atom and a lower-alkyl radical; and $m$ is an integer from 1 to 2 and (B) acid addition salts thereof.

2. 1-phenyl-2-piperazinone p-toluenesulfonate.
3. 1-(4-chlorophenyl)-2-piperazinone hydrochloride.
4. 1 - (2,6 - dimethylphenyl)-2-piperazinone hydrochloride.
5. 4 - benzyl - 1 - (2,6 - dimethylphenyl) - 2 - piperazinone hydrochloride.
6. 1-benzyl-4-phenyl-3-piperazinone.
7. 1-benzyl-4-phenyl-3-piperazinone benzochloride.

References Cited in the file of this patent

UNITED STATES PATENTS

| | | |
|---|---|---|
| 2,633,467 | De Benneville | Mar. 31, 1953 |
| 2,653,153 | De Benneville | Sept. 22, 1953 |
| 2,904,548 | Rice et al. | Sept. 15, 1959 |
| 3,062,821 | Archer | Nov. 6, 1962 |
| 3,072,658 | Fancher et al. | Jan. 8, 1963 |
| 3,091,615 | Cusic et al. | May 28, 1963 |

OTHER REFERENCES

Martin et al.: Journal American Chemical Society, vol. 72, pages 4301–4302 (1950).

UNITED STATES PATENT OFFICE
CERTIFICATE OF CORRECTION

Patent No. 3,146,234            August 25, 1964

Sydney Archer

It is hereby certified that error appears in the above numbered patent requiring correction and that the said Letters Patent should read as corrected below.

Column 12, line 6, for "A0.5 mole)" read -- (0.5 mole) --; line 39, for "N, 801;" read -- N, 8.01; --; column 14, TABLE 2, third column, line 1 thereof, for "$C_5H_6$" read -- $C_6H_5$ --; column 15, line 21, for "in corporated" read -- incorporated --.

Signed and sealed this 5th day of January 1965.

(SEAL)
Attest:

ERNEST W. SWIDER            EDWARD J. BRENNER
Attesting Officer            Commissioner of Patents